(12) United States Patent
Yagi et al.

(10) Patent No.: US 6,669,511 B1
(45) Date of Patent: Dec. 30, 2003

(54) STRUCTURE FOR CONNECTING SHIELDED CABLE TO SHIELD CONNECTOR

(75) Inventors: Sakai Yagi, Shizuoka (JP); Hirotaka Fukushima, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 94 days.

(21) Appl. No.: 09/645,596

(22) Filed: Aug. 25, 2000

(30) Foreign Application Priority Data

Aug. 26, 1999 (JP) .......................................... P11-240214

(51) Int. Cl.⁷ ................................................. H01R 9/03
(52) U.S. Cl. ......................................... 439/610; 439/98
(58) Field of Search ........................ 439/610, 98, 578; 174/65 R, 578, 579, 580, 581, 582, 583, 584, 585

(56) References Cited

U.S. PATENT DOCUMENTS

| | | | | |
|---|---|---|---|---|
| 3,897,127 A | * | 7/1975 | Haitmanek | 339/97 |
| 5,013,872 A | * | 5/1991 | Lockwood et al. | 174/65 R |
| 5,151,053 A | * | 9/1992 | Shinji et al. | 439/610 |
| 5,315,063 A | * | 5/1994 | Auclair | 174/78 |
| 5,491,766 A | * | 2/1996 | Huynh et al. | 385/100 |
| 5,691,506 A | * | 11/1997 | Miyazaki et al. | 174/65 R |
| 5,823,804 A | * | 10/1998 | Auclair | 439/98 |
| 6,042,396 A | * | 3/2000 | Endo et al. | 439/98 |
| 6,087,584 A | * | 7/2000 | Daoud | 174/50.59 |

FOREIGN PATENT DOCUMENTS

| | | |
|---|---|---|
| EP | 0 161 910 | 11/1985 |
| GB | 1 449 154 | 9/1976 |
| JP | 10-189147 | 7/1998 |

* cited by examiner

Primary Examiner—Alexander Gilman
(74) Attorney, Agent, or Firm—Morgan, Lewis & Bockius LLP (57) ABSTRACT

A connector housing has a conductive portion. A bus bar is disposed in the connector housing. A shielded cable has a core wire and a shield member for shielding the core wire. A terminal fixture one end of which is attached to the core wire and the other end of which is fixed on the bus bar. A shield terminal a first end of which holds the shielded cable while being connected to the shield member, and a second end of which is fixed on the conductive portion of the connector housing, the shield terminal having a connecting member for elastically connecting the first and second ends thereof.

7 Claims, 11 Drawing Sheets

STRUCTURE FOR CONNECTING SHIELDED CABLE TO SHIELD CONNECTOR

BACKGROUND OF THE INVENTION

The present invention relates to a structure for connecting a shielded cable to a shield connector in which probability of occurrence of a connection failure is reduced.

Figure 9:
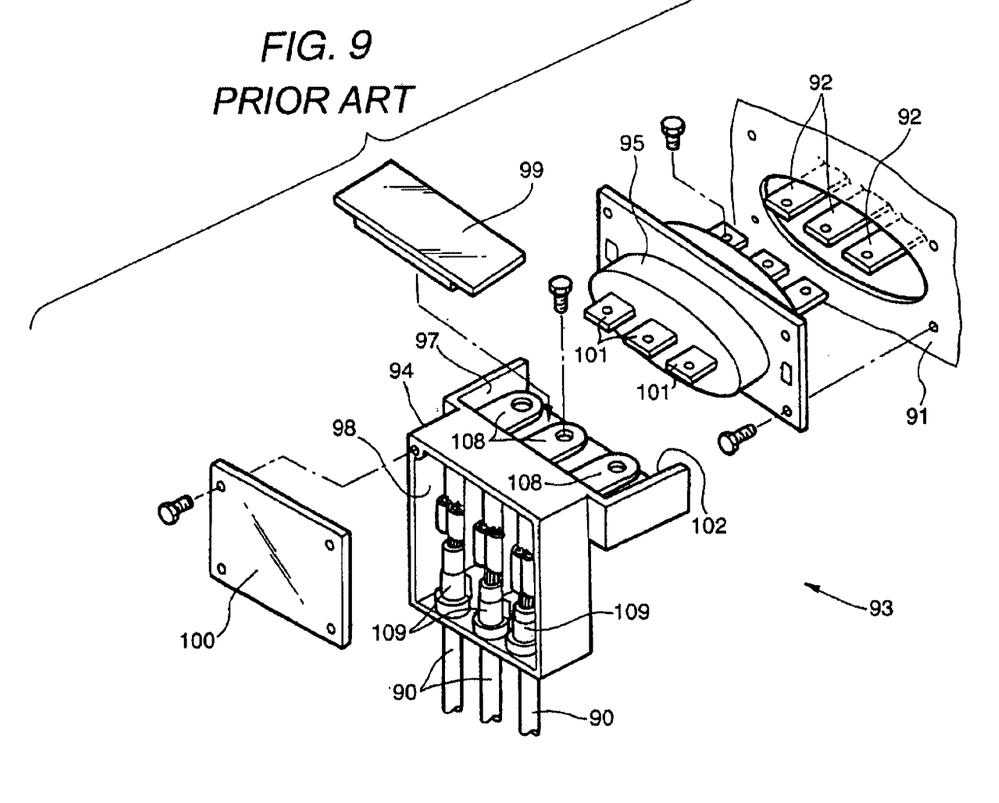
FIG. 9 is an exploded perspective view showing a related connecting structure.

FIG. 9 illustrates a related shield connector 93 to be used for connecting a shielded cable 90 to a terminal 92 of the electric equipment 91.

Figure 10:
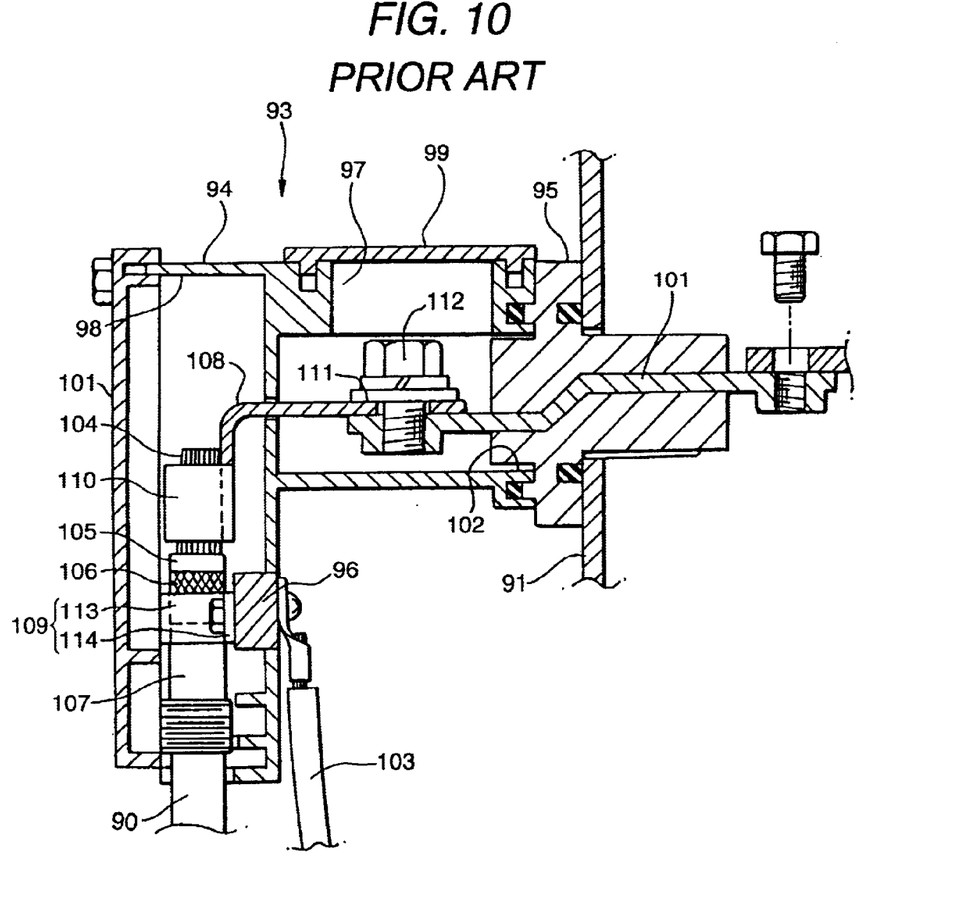
FIG. 10 is a cross-sectional view showing the related connecting structure.

As shown in FIG. 10 as well, the shield connector 93 comprises a connector casing 94 having insulating property and being formed generally in L-shape, a bus bar holder 95 to be mounted to the connector casing 94, and a conductive portion 96 provided on the connector casing 94, and covers 99 and 100 for covering openings 97 and 98 of the connector casing 94.

The bus bar holder 95 includes three bus bars 101 formed by insert molding. The bus bar holder 95 is mounted to a mount opening 102 such that one end of each bus bar 101 is accommodated within the connector casing 94 and the other end of each bus bar 101 is exposed outside the connector casing 94. The conductive portion 96 is a conductive metal member formed so as to penetrate the elevating face of the connector casing 94 by insert molding, and provided with an earth cable 103 connected thereon.

The shielded cable 90 comprises a core wire 104, a covered layer 105, a shield member 106, and a sheath 107 all of which are concentrically laminated, and the end of the core wire 104 is connected to one end of the bus bar 101 via the terminal fixture 108 and to the conductive portion 96 via a conductive shield terminal 109 that cramps the shield member.

Figure 11:
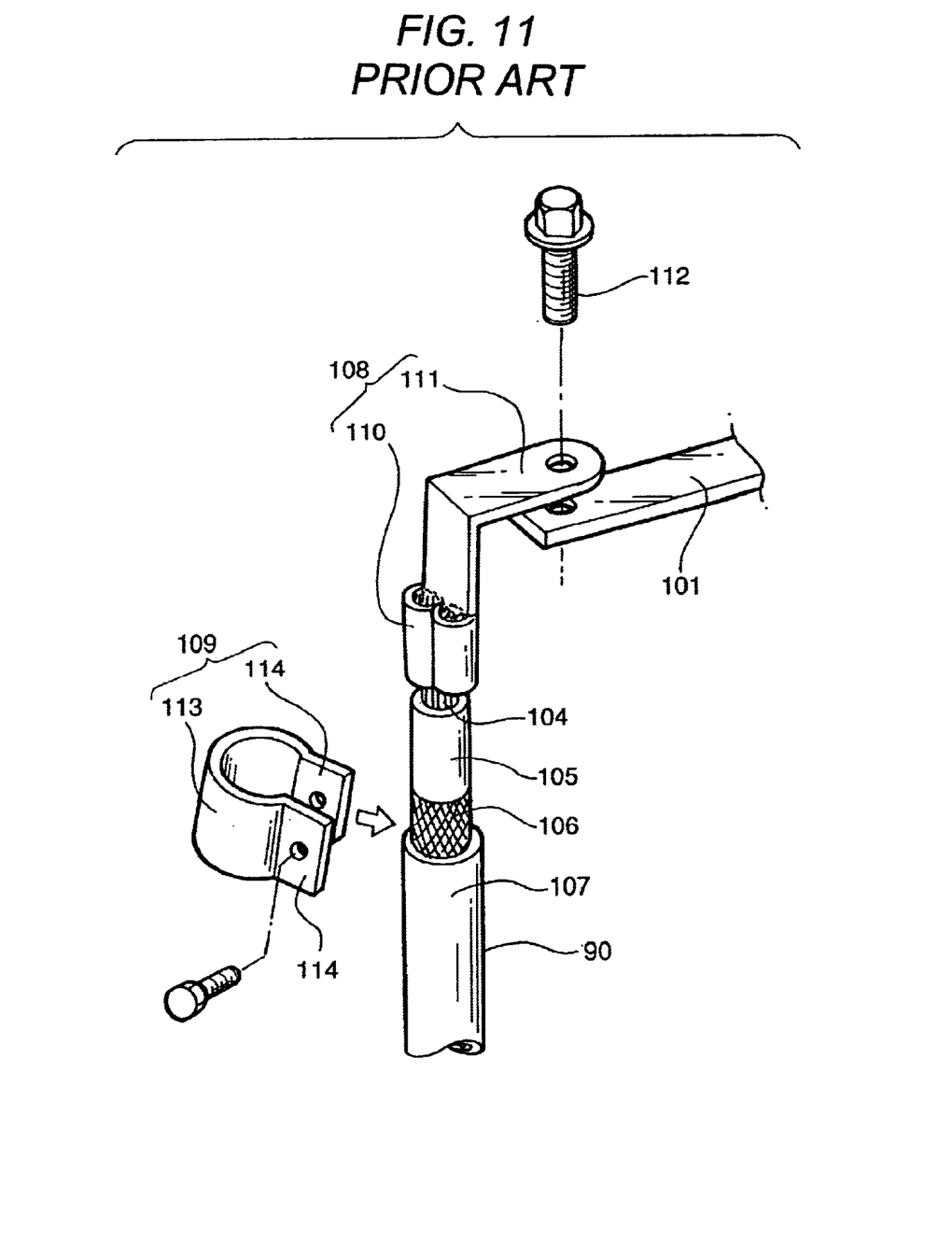
FIG. 11 is an exploded perspective view showing a shield terminal of the related connecting structure.

As shown in FIG. 11, the terminal fixture 108 is a strip formed by bending generally into L-shape, and provided with a crimping portion 110 to which the core wire 104 of the shielded cable 90 is connected at the proximal end thereof, and with a hole at the distal end 111 thereof to which a connecting bolt 112 is to be inserted in the direction of the thickness thereof.

On the other hand, the shield terminal 109 comprises an anchoring portion 113 generally of C-shape in cross-section for anchoring the shield member 106 exposed from the shielded cable 90, and flat fixed portions 114 provided on both circumferential ends of the anchoring portion 113. The shield terminal 109 lessens the diameter of its anchoring portion 113 to crimp the shield member 106 by screwing the fixing bolt 115 that penetrates the fixed portions 114 into the conductive portion 96, whereby the shielded cable 90 is fixed in such a manner that the distal end 111 of the terminal fixture 108 is In the shield connector 93 as described above, after the shielded cable 90 is fixed to the conductive portion 96 of the connector casing 94 via a shield terminal 109, the bus bar holder 95 is mounted on the mount opening 102 of the connector casing 94 so that one end of each bus bar 101 is overlaid on the distal end 111 of the terminal fixture 108, and then the bus bar 101 and the terminal fixture 108 are connected via the connecting bolt 112.

In the related connector described above, since the position of the bus bar 101 is fixed, the terminal fixture 108 moves slightly toward to the bus bar 101 when the bus bar 101 and the terminal fixture 108 are connected via the connecting bolt 112.

In this example of a related connector, since the distal end 111 of the terminal fixture 108 is overlaid on the bus bar 101, the shielded cable 90 slightly moves in the longitudinal direction thereof (downward in the figure) when the bus bar 101 and the terminal fixture 108 are connected via the connecting bolt 112.

In case where the distal end 111 of the terminal fixture 108 is underlying the bus bar 101, the shielded cable 90 slightly moves in the longitudinal direction thereof (upward in the figure) when the bus bar 101 and the terminal fixture 108 are connected via the connecting bolt 112.

However, in the example of the related connector described above, since the relative position between the anchoring portion 113 and the fixed portion 114 of the shield terminal 109 is fixed, in case where the relative position between the terminal fixture 108 and the shield terminal 109 is deviated in the direction away from each other, fixing the shielded cable 90 via the shield terminal 109 isolates the distal end 111 of the terminal fixture 108 from the upper face of the bus bar 101.

In addition, in the example of the related connector described above, when the connecting bolt 112 is screwed into the bus bar 101 in such a situation, the anchoring portion 113 of the shield terminal 109 may not be able to follow the movement of the shielded cable 90, whereby the shield terminal 109 may hinder the movement of the shielded cable 90, in other words the movement of the terminal fixture 108 toward the bus bar 101, thus causing a connection failure between the bus bar 101 and the terminal fixture 108, or an earthing failure of the shield member 106 by being detached from the anchoring portion as the shielded cable 90 moves.

Likewise, in case where the distal end 111 of the terminal fixture 108 is underlying the bus bar 101, when the relative position between the terminal fixture 108 and the shield terminal 109 is deviated in the direction toward each other, there is a probability of occurrence of a connection failure between the bus bar 101 and the terminal fixture 108 or an earthing failure of the shield member 106 by being detached from the anchoring portion 113.

SUMMARY OF THE INVENTION

The invention is provided with problems described so far in view, and accordingly, it is an object of the invention to provide a structure for connecting a shielded cable in shield connector in which probability of occurrence of a connection failure or an earthing failure is reduced.

In order to achieve the above object, according to the present invention, there is provided a connecting structure comprising:

a connector housing having a conductive portion;

a bus bar disposed in the connector housing;

a shielded cable having a core wire and a shield member for shielding the core wire;

a terminal fixture one end of which is attached to the core wire and the other end of which is fixed on the bus bar; and a shield terminal a first end portion of which holds the shielded cable while being connected to the shield member, and a second end portion of which is fixed on the conductive portion of the connector housing, the shield terminal having a connecting member for elastically connecting the first and second end portions thereof.

While a connecting member in this example is shown to be in the shape of a plate or a shaft, any configuration may be used as far as elasticity depending on flexibility, or torsional property of this particular connecting portion can be obtained.

According to the above configuration, when the shielded cable moves in the longitudinal direction thereof with the terminal fixture fixed to the bus bar, the connecting member extends as appropriate so that the first end portion thereof can follow the movement of the shielded cable.

Therefore, since the first end portion of the shield terminal can follow the movement of the shielded cable even when the relative position between the terminal fixture and the shield terminal is displaced away from each other, the probability of occurrence of a connection failure between the bus bar and the terminal fixture or an earthing failure of the shield member maybe reduced, thereby having achieved the object described above.

Preferably, a surplusage bent portion is formed on the connecting member to realize the elasticity thereof.

The bent portion shown here may be formed generally in U-shape, Z-shape, or S-shape at a predetermined location thereof in case where the connecting member is formed of a plate, and may be formed generally in the shape of a coil spring at a predetermined location thereof in case where the connecting portion is formed of a shaft.

According to the above configuration, the bent portion of the connecting member provides a satisfactory elasticity in comparison with the case where elasticity is obtained depending on the flexibility or torsional property of the connecting member itself, thereby improving adaptability of the first end portion of the shield terminal to the shielded cable.

Preferably, the first end portion of the shield terminal is formed into a cylindrical shape through which the shielded cable is passed, and around which a collar member is fitted. The shield member of the passed shielded cable is folded back and cramped between the outer periphery of the cylindrical portion and the collar member.

According to the above configuration, even when the cylindrical portion moves following the shielded cable, the anchoring state of the cylindrical portion with respect to the shield member may be maintained, thus further lowering the probability of occurrence of an earthing failure.

Preferably, the connecting member is spaced from the: face of the connector casing on which the second end portion of the shield terminal is fixed.

According to the above configuration, expanding and bending motion of the connecting member is easily made, whereby the first end portion of the shield terminal can follow the movement of the shielded cable in the longitudinal or radial directions thereof.

DETAILED DESCRIPTION OF THE PREFERRED EMBODIMENTS

Referring now to the drawings, the invention will be described according to the embodiments of the invention.

Figure 1:
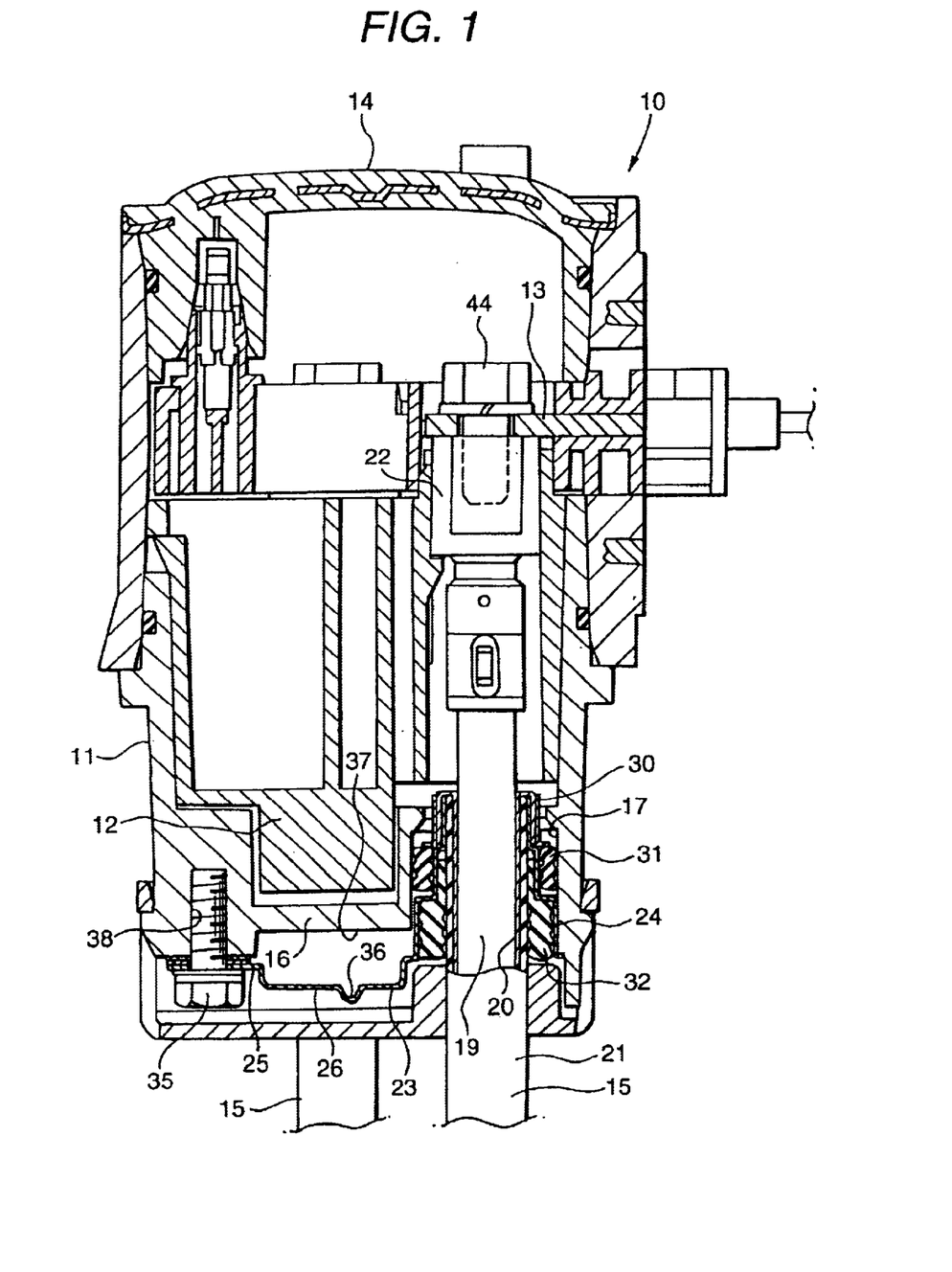
FIG. 1 is a schematic cross-sectional view showing a connecting structure according to a first embodiment of the invention.

As shown in FIG. 1, the shield connector 10 according to a first embodiment of the invention comprises a connector casing 11, an insulation housing 12 received within the connector casing 11, a bus bar 13 disposed in the connector casing 11, and a cover 14 to be mounted on the connector casing 11, wherein the shielded cable 15 is inserted through a mount hole 17 formed on the bottom of the connector casing 11 and connected to the bus bar 13.

The connector casing 11 is formed of a suitable conductive metal such as aluminum generally in the shape of a cylinder with a bottom, and connected with an earth cable (not shown). The connector casing 11 is provided with three through holes 17 on the bottom portion 16, through each of which the shielded cable 15 is inserted.

The insulation housing 12 is formed of a suitable synthetic resin in the shape that can cover the inner face of the connector casing 11. The bus bar 13 is formed generally in the shape of a band, and disposed along the opening face of the connector casing 11.

On the other hand, the shielded cable 15 comprises a core wire 18, a covering layer 19, a braided wire 20 as a shield member, and a sheath 21 concentrically laminated in order, and is provided with a terminal fixture 22 mounted at the end of the core wire 18 thereof, and a shield terminal 23 mounted at a predetermined position thereof.

In this embodiment, the connector casing 11 and the core wire 18 of the shield connector are insulated by placing the insulation housing 12 in the metallic connector casing 11, it is also possible to insulate between the connector casing 11 and the core wire 18 of the shield connector 10 by using a connector casing made of a resin.

In such a case, the shield connector 10 may eliminate the insulation housing 12 and be provided with an earth cable connected to the conductive metal formed so as to penetrate the connector casing 11 by insert molding.

A connecting bolt 44 is screwed into the terminal fixture 22 in the longitudinal direction of the shielded cable 15 while passing through the bus bar 13 in the thickness direction thereof.

Figure 2:
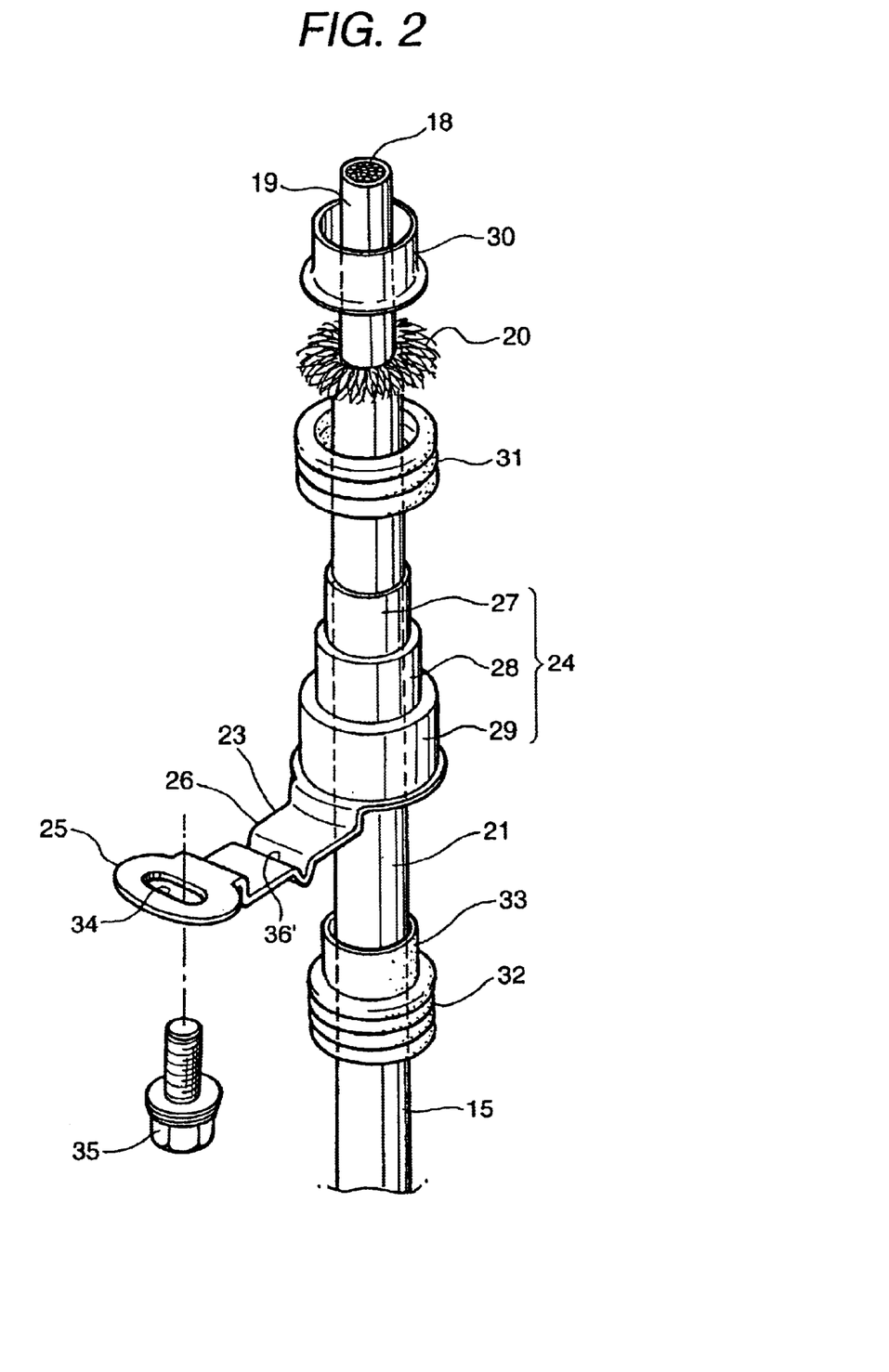
FIG. 2 is an enlarged exploded perspective view showing a shield terminal shown in FIG. 1.

As also shown in FIG. 2, the shield terminal 23 comprises an anchoring portion to be anchored to the braided wire 20, a fixed portion 25 to be fixed on the bottom portion of the connector casing 11, and a connecting portion 26 connecting the anchoring portion 24 and the fixed portion 25, in which the anchoring portion 24, the fixed portion 25, and the connecting portion 26 are formed unitarily of a suitable conductive metal.

The anchoring portion 24 is formed in a stepped cylindrical shape with a small diameter section 27, a medium diameter section 28, and a large diameter section 29 arranged along the identical axis.

The small diameter section 27 can receive the sheath 21 of the shielded cable 15 therethrough and a collar 30 generally in the shape of a cylinder having a flange on the outer periphery thereof. The first sealing member 31 generally in the shape of a cylinder to be fitted on the medium diameter section 28 is provided with ribs formed on the inner face and the outer face so as to continue along the circumference thereof. The second sealing member 32 to be fitted in the large diameter section 29 is provided with ribs formed on the inner face and the outer face so as to continue along the circumference thereof, and has a stepped configuration having a extended portion 33 extending within the medium diameter section 28.

Whether the collar 30 has conductivity or not is optional. In case where the collar 30 is formed of a metal, it resists deformation or deterioration caused by heat in comparison with the case where the collar 30 is formed of a resin, and thus the braided wire 20 may be cramped reliably and stably.

The fixed portion 25 is generally in the shape of a plate having an elongated hole 34 through which the fixing bolt 35 to be screwed into the outer face of the bottom portion 16 of the connector casing 11 can be inserted.

The connecting portion 26 is generally in the shape of a plate spanning between the end of the large diameter section 29 of the anchoring portion 24 and the edge of the fixed portion 25, and provided with a bent portion 36 formed generally in U-shape at about the center of the length thereof.

The procedure for fixing the shielded cable 15 in the shield connector 10 and connecting the shielded cable 15 to the bus bar 13 will now be described.

As a first step, the shielded cable 15 is passed through the second sealing member 32, the anchoring portion 24 of the shield terminal 23, and the first sealing member 31, then the covering layer 19 and the braided wire 20 are exposed stepwise from the shielded cable 15, and the braided wire 20 is disentangled so as to be radially widened as shown in FIG. 2.

Then the first sealing member 31 is fitted onto the middle diameter section 28 of the anchoring portion 24, the end of the small diameter section 27 of the anchoring portion 24 is arranged so as to abut the braided wire 20 and the second sealing member 32 is fitted into the large diameter section 29, thereby providing hermetically between the shielded cable 15 and the anchoring portion 24.

Then the braided wire 20 are folded at the end of the small diameter section 27 of the anchoring portion 24 back along the outer periphery of the small diameter section 27, and the collar 30 is fitted onto the small diameter section 27 in such a manner that the braided wire 20 is cramped between the small diameter section 27 and the collar 30.

Figure 3:
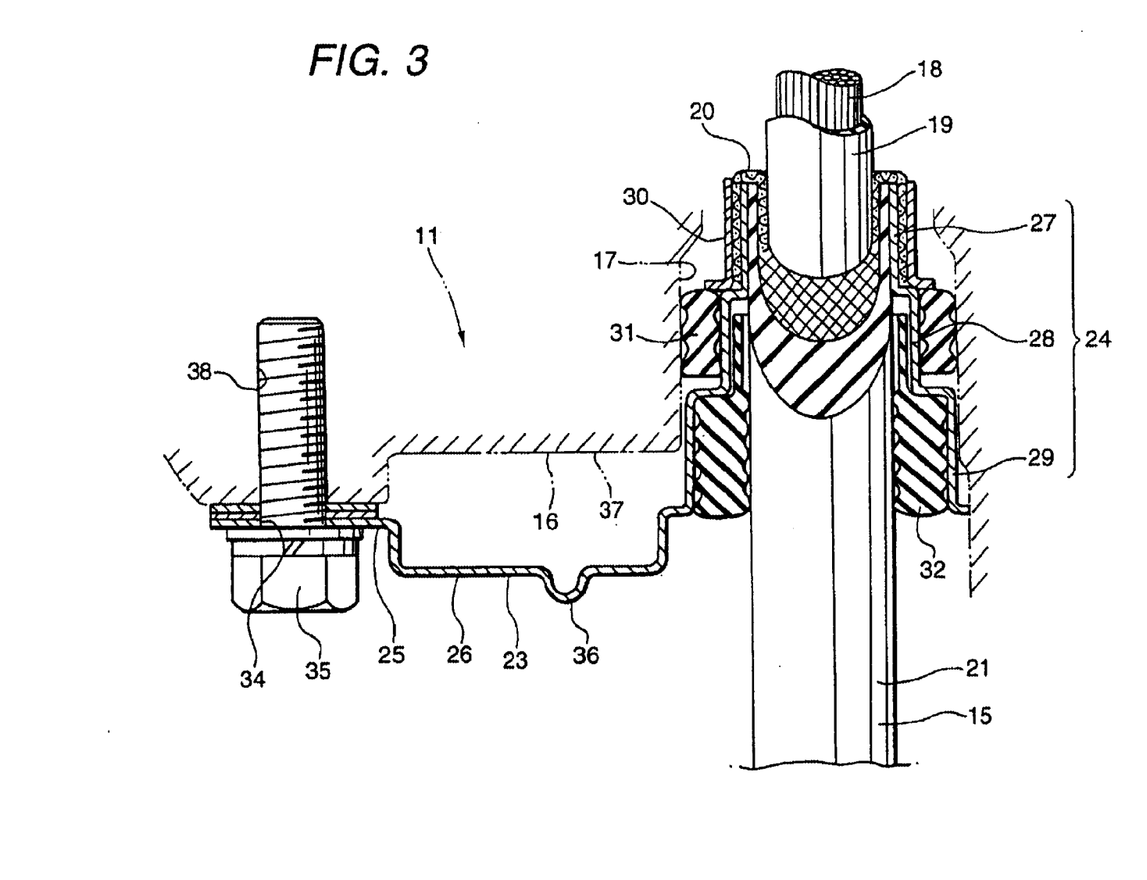
FIG. 3 is an enlarged cross sectional view showing the shield terminal.

Subsequently, as shown in FIG. 3, the shielding cable 15 is inserted into the mount hole 17 of the connector casing 11 in such a manner that the anchoring portion 24 is press-fitted into the mount hole 17 via the first sealing member 31, and the fixing bolt 35 to be inserted into a slot 34 on the fixed portion 25 is screwed into the threaded portion 38 formed on the outer face 37 of the bottom portion 16 of the connector casing 11, so that the shield terminal 23 is fixed. The shield terminal 23 thus fixed is disposed in such a manner that the connecting portion 26 thereof is spaced from the bottom face 37 of the connector casing 11.

In this case, the first sealing member 31 provides hermeticity between the anchoring portion 24 and the mount hole 17.

In the first embodiment, mount holes are formed at vertexes of a imaginary triangle along the outer face of the bottom portion of the connector casing 11, into which the shielded cables 15 are inserted respectively.

On these shielded cables 15, there are provided the shield terminals 23 described above and shield terminals 39 shown in FIG. 4.

Figure 4:
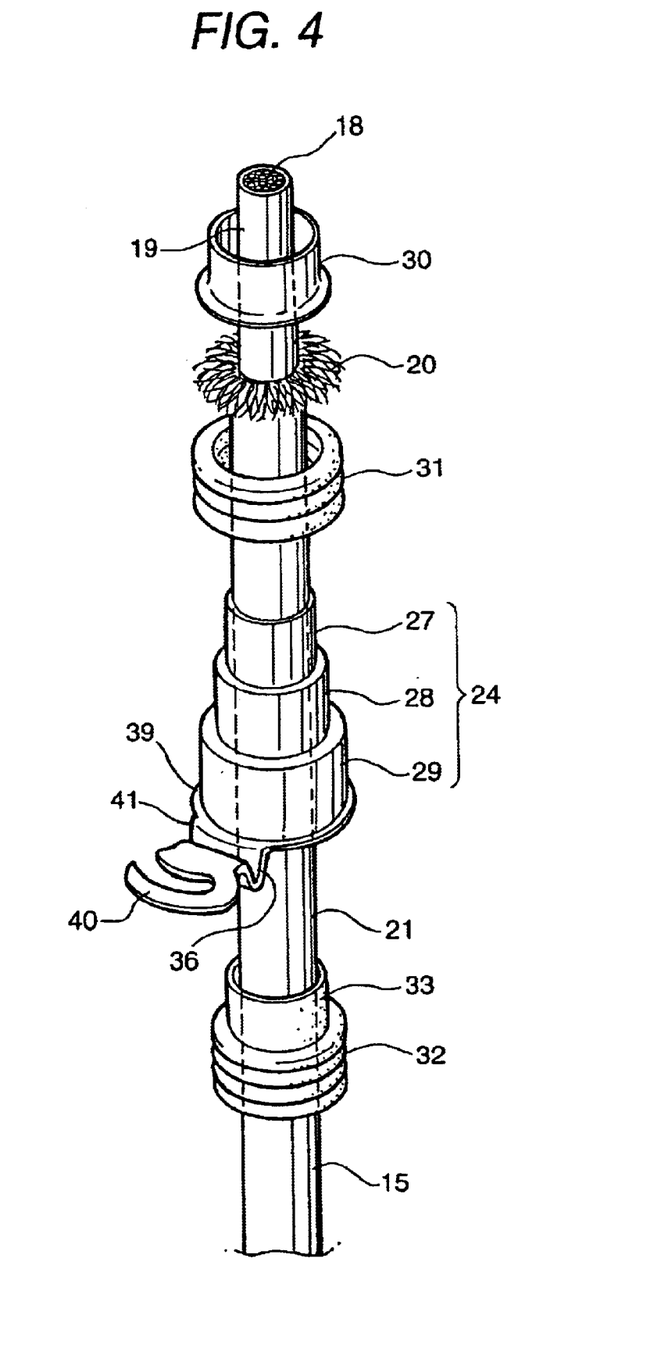
FIG. 4 is an enlarged exploded perspective view showing another shield terminal.

In other words, the shield terminal 39 shown in FIG. 4 has basically the same configuration as the shield terminal 23 except that it has a fixed portion 40 generally of C-shape and a connecting portion 41 having a longitudinal dimension shorter than the shield terminal 23.

Figure 5:
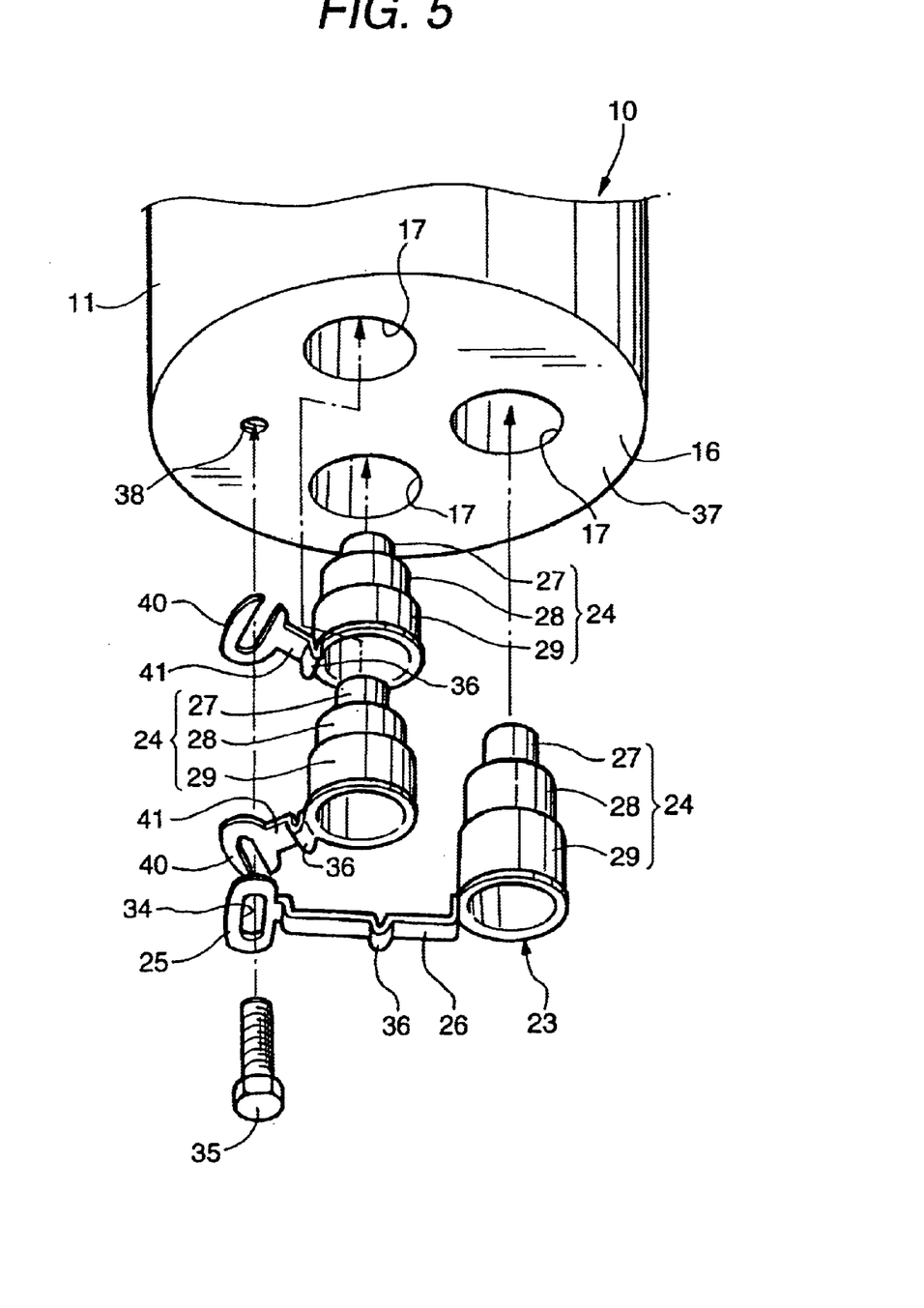
FIG. 5 is a schematic perspective view illustrating how to use the shield terminal.

As shown in FIG. 5, the shield terminal 23 is used for the mount hole 17 that is located far from the threaded portion 38, and the shield terminals 39, 39 are used for the mount holes that are located near the threaded portion. These shield terminals 23 and 39 are fixed on the outer face 37 of the bottom portion 16 of the connector casing 11 by means of a common fixing bolt 35.

In FIG. 5 the shielded cables 15 are not shown in the interest of clarity.

Figure 6:
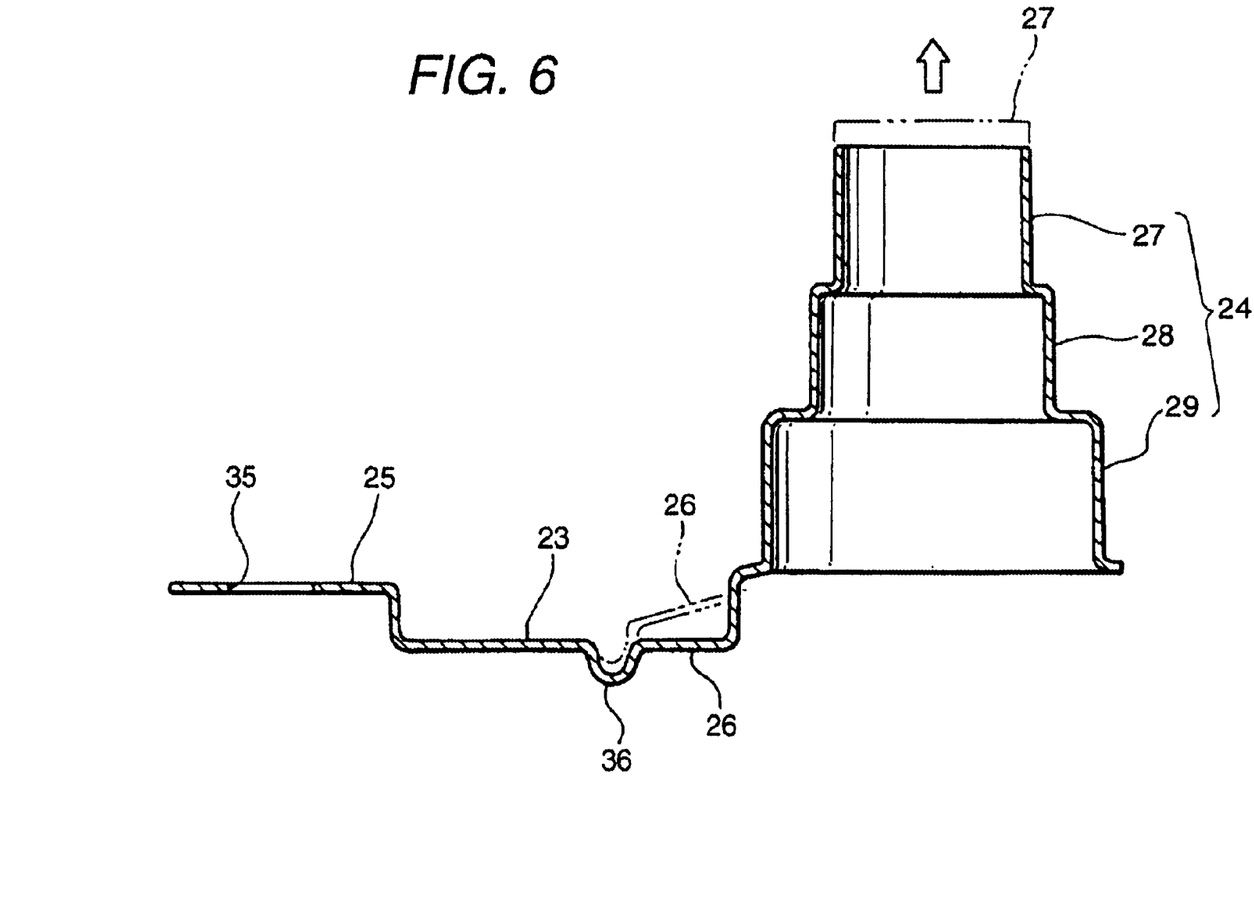
FIG. 6 is an enlarged cross-sectional view illustrating the effect of the shield terminal.

In the first embodiment as described thus far, since the anchoring portion 24 and the fixed portion 25 of the shield terminal 23 are connected by the connecting portion 26, and the connecting portion 26 is provided with a bent portion 36, in case where the relative position of the terminal fixture 22 and the shield terminal 23 is deviated in the direction away from each other, even when the shielded cable 15 is moved in the longitudinal direction thereof by fixing the terminal fixture 22 to the bus bar 13, the anchoring portion 24 can follow the movement of the shielded cable 15 owing to the expanding movement of the bent portion 36 or the bending motion of the connecting portion 26 in the direction of the thickness with the bent portion 36 as a fulcrum, thereby reducing the probability of occurrence of a connection failure between the bus bar 13 and the terminal fixture 22, or an earthing failure of the braided wire 20.

Especially, according to the first embodiment, the anchoring portion 24 of the shield terminal 23 is formed generally in cylindrical shape through which the shielded cable 15 may be passed, and the braided wire 20 is folded at the end of the small diameter section back along the outer periphery of the small diameter section 27 and cramped between the small diameter section 27 and the collar 30, which ensures that the anchoring state of the anchoring portion 24 to the braided wire 20 is maintained, thereby reducing the probability of occurrence of an earthing failure.

With the shield terminal 23 of this embodiment, since the first sealing member 31 and the second sealing member 32 are fitted onto and into the anchoring portion 24, hermeticity at the mount hole 17 is ensured, thereby improving water-tight property of the shield connector 10.

In addition, with the shield terminal 23 as stated above, since the connecting portion 26 is disposed so as to be spaced from the outer face 37 of the bottom portion 16 of the connector casing 11, expanding and bending motion about the bent portion 36 is easily made, whereby the anchoring portion 24 can follow the movement of the shielded cable 15 in the longitudinal or radial directions thereof.

Figure 7:
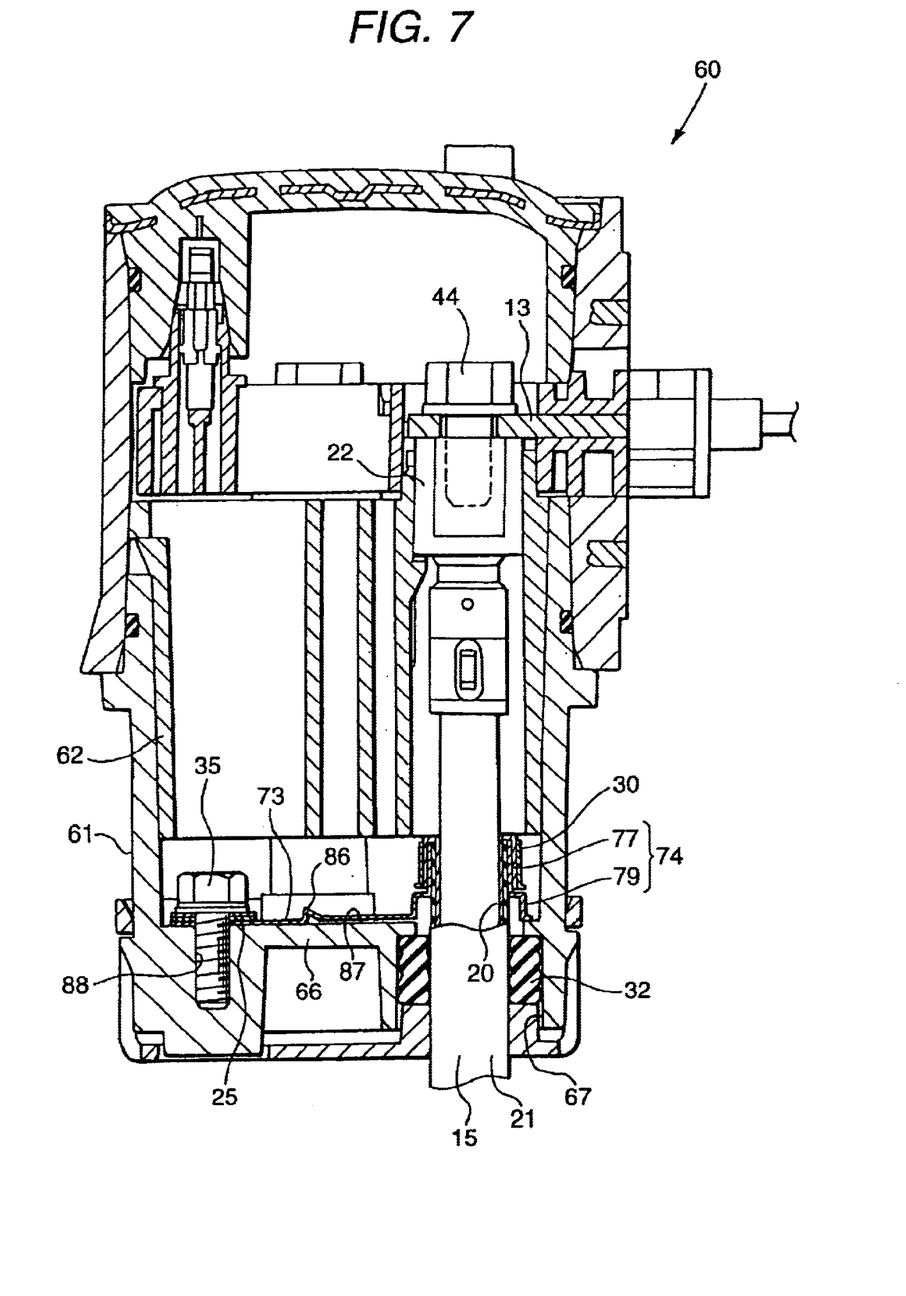
FIG. 7 is a schematic cross-sectional view showing a connecting structure according to a second embodiment of the invention.
Figure 8:
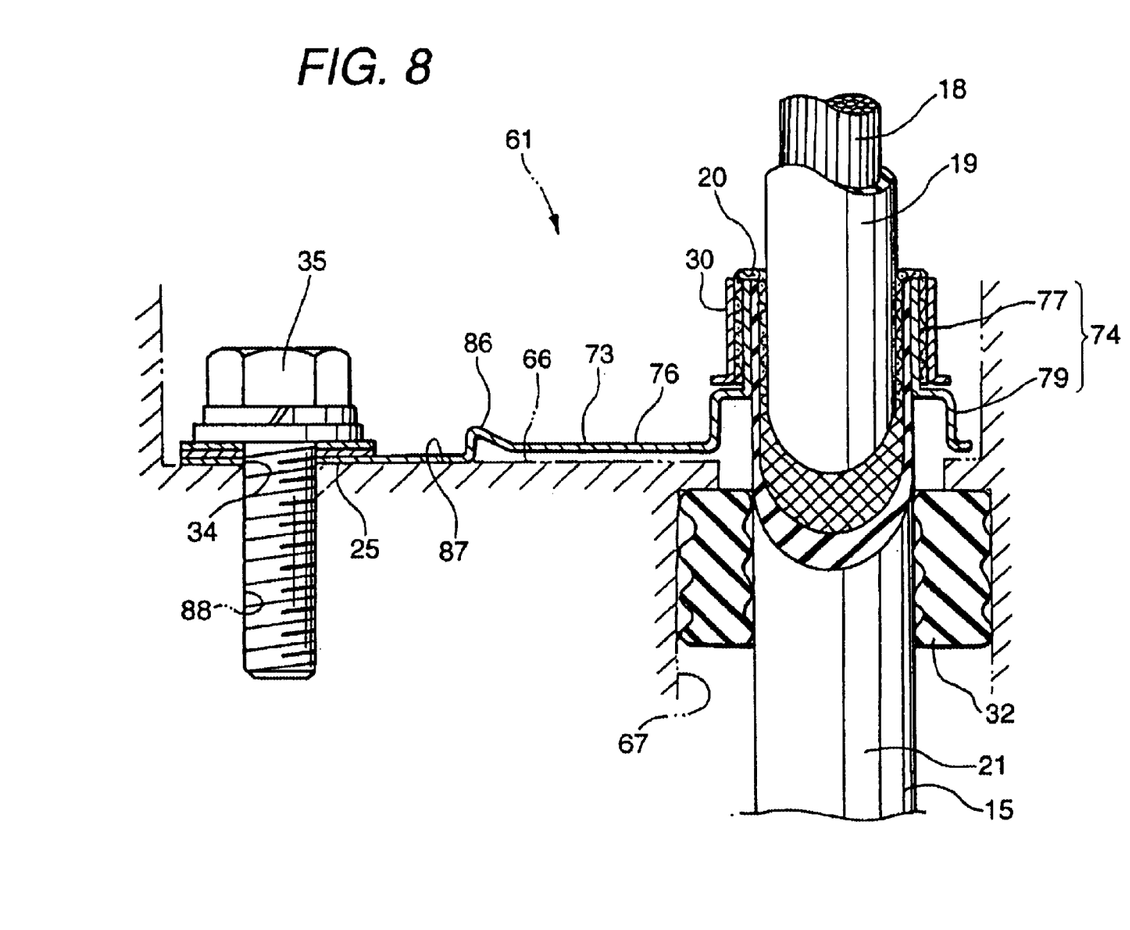
FIG. 8 is an enlarged exploded perspective view showing a shield terminal shown in FIG. 7.

FIGS. 7 and 8 illustrate the second embodiment of the invention. In the second embodiment, as regards the components having already described referring to FIGS. 1 to 6 description will be simplified or omitted by designating the identical or corresponding numerals.

In the second embodiment, a shield terminal 73 is fixed on the inner face of a bottom portion 66 of a connector casing 61 by means of a fixing bolt 35.

An anchoring portion 74 of the shield terminal 73 has a stepped cylindrical shape having a small diameter section 77 and a large diameter section 79, and the middle diameter section as in the first embodiment is not provided here. A connecting portion 76 of the shield terminal 73 includes a generally V-shaped bent portion 86, and has a difference in height in the direction of its thickness between the anchoring portion side and the fixed portion side with a boundary on the bent portion 86.

In the second embodiment having such a structure, the shielded cable 15 that is inserted into the second sealing member 32 in advance is inserted through the mount hole 67 and received in the connector casing 61, and then inserted through the anchoring portion 74 of the shield terminal 83, then the covering layer 19 and the braided wire 20 are exposed stepwise from the shielded cable 15, and the braided wire 20 is disentangled so as to be radially widened.

Then the end of the small diameter section 77 of the anchoring portion 74 is disposed so as to abut the braided wire 20, and the braided wire 20 is folded at the end of the small diameter section 77 back along the outer periphery of the small diameter section 77 and cramped between the small diameter section 77 and the collar 30.

Then the fixing bolt 35 to be inserted into the slot 34 on the fixing portion 35 is screwed into a threaded portion 88 formed on an inner face 87 of the bottom portion 66 of the connector casing 61, so that the shield terminal 73 is fixed. The conductive terminal 73 thus fixed is disposed in such a manner that the anchoring portion side from the bent portion 86 of the connecting potion 76 is spaced from the inner face 87 of the bottom portion 66 of the connector casing 61.

Finally, the second sealing member 32 is moved along the shielded cable 15 and press fitted within the mount hole 67 to provide hermeticity between the shielded cable 15 and the mount hole 67.

According to the second embodiment as described above, since the anchoring portion 74 and the fixed portion 25 of the shield terminal 73 are connected by the connecting portion 76, and the bent portion 86 is provided on a connecting portion 76, the probability of occurrence of a connection failure between the bus bar 13 and the terminal fixture 22 or an earthing failure of the braided wire 20 as in the first embodiment described above may be reduced.

In addition, in the shield terminal 73 of the second embodiment, the braided wire 20 is basically cramped between the small diameter section 77 of the anchoring portion and the collar 30 in the same manner as the shield terminal of the first embodiment described above, whereby the same effect as the first embodiment in that the anchoring state of the anchoring portion with respect to the braided wire 20 may be reliably maintained may be achieved.

On the other hand, according to the second embodiment described above, since the shield terminal 73 is fixed on the inner face 87 of the bottom portion 66 of the connector casing 61, press fitting the second sealing member 32 into the mount hole 67 provides hermeticity between the shielded cable 15 and the mount hole 87.

In other words, according to the second embodiment, the first sealing member as shown in the first embodiment described above may be eliminated, thereby reducing the number of the components in comparison with the first embodiment described above.

The invention is not limited to the embodiments described above, but various modifications and improvements are possible as appropriate.

For example, though a conductive connector casing of which the whole part has conductivity is taken as an example in the embodiment described above, it is also possible to provide an insulating connector casing having a conductive member formed at a predetermined location by insert molding, or a connector casing including a conductive portion at a specified location by plating at a predetermined region on the face of the connector casing with a conductive material.

While a braided wire is used as a shield member in the respective embodiments described above, a metallic tape that can be wound around the covered layer of the shielded cable generally in a helical manner, for example, may be used as a shield member of the invention.

The shield connector, the connector casing, the bus bar, the conductive portion, the shielded cable, the core wire, the terminal fixture, the shield member, the shield terminal, the anchoring portion, the fixed portion, the connecting portion, the bent portion, the material, configuration, dimension, mode number, locations of the collar, and so on are not limited but optional as far as the present invention can be achieved.

What is claimed is:

1. A connecting structure, comprising:

a connector housing having a conductive portion;

a shielded cable having a core wire and a shield member for shielding the core wire; and a shield terminal including a cylindrical portion which holds the shielded cable while being connected to the shield member, and an arm portion which connects the cylindrical portion and the conductive portion of the connector housing, wherein the arm portion extends so as to be deformable in both of a parallel direction and a perpendicular direction with respect to a direction in which the cylindrical portion extends, and the arm portion includes a substantially plated-shaped member with a bent portion therein, the bent portion has one of a U-shape and a V-shape.

2. The connecting structure as set forth in claim 1, further comprising a collar member fitted around the cylindrical portion, wherein the shield member of the shielded cable is folded back and cramped between the outer periphery of the cylindrical portion and the collar member.

3. The connecting structure as set forth in claim 1, the arm portion is spaced away from the face of the connector casing on which one end portion of the arm portion is fixed.

4. The connecting structure as set forth in claim 1, further comprising a bus bar disposed in the connector housing and connected to the core wire of the shielded cable.

5. The connecting structure set forth in claim 1, wherein the surplusage bent portion provides deformability of the arm portion in at least a direction perpendicular with respect to a direction in which the cylindrical portion extends.

6. The connecting structure set forth in claim 1, wherein a surplusage bent portion is formed on the arm portion.

7. The connecting structure set forth in claim 6, wherein the surplusage bent portion provides deformability of the arm portion in at least a direction perpendicular with respect to a direction in which the cylindrical portion extends.

* * * * *